March 1, 1927.

J. MORAVEC

1,619,151

LOG BARKING APPARATUS

Filed Aug. 2, 1924

March 1, 1927.  J. MORAVEC  1,619,151
LOG BARKING APPARATUS
Filed Aug. 2, 1924    9 Sheets-Sheet 9

Patented Mar. 1, 1927.

1,619,151

UNITED STATES PATENT OFFICE.

JOHN MORAVEC, OF VANCOUVER, BRITISH COLUMBIA, CANADA.

LOG-BARKING APPARATUS.

Application filed August 2, 1924. Serial No. 729,781.

This invention relates to devices for removing the bark from logs, it being designed to provide an apparatus wherein the bark-removing operation is carried out with a minimum of time expenditure and in a complete manner.

It is also the object of the invention to provide means whereby the logs will be fed to the parts performing the bark-removing operations and removed therefrom, as the bark removal is completed, automatically.

A further object of the invention is to make the action of the parts of the apparatus adjustable so as to adapt it to operation with logs of varying characters; that is to say, logs requiring a greater or less time for the removal of the bark therefrom.

An apparatus of this character, manipulating such heavy material as logs, is subject to severe strains and to considerable wear, and it is another object of the invention to reduce to the greatest extent possible such wear and strains and to make the structure such that it can effectually resist those strains that cannot be eliminated.

Other objects and features of the invention will appear from the following description, in which I have shown several exemplifications of the preferred manner of carrying out my said invention, it being understood that the same is not limited to any specific form, arrangement or construction of parts, except in so far as defined in the claims.

In the accompanying drawings, in which the same characters of reference designate the same parts in all the figures, I have shown the preferred embodiment of my invention.

In these drawings:

Fig. 1 is a sectional side elevation of one form of apparatus under said invention.

Figs. 1ª, 1ᵇ, 1ᶜ and 1ᵈ are detail views thereof.

Referring first to Figs. 1 to 4 of the drawing, it will be observed that the apparatus therein shown comprises an upper log-deck A to which the logs $a$ to be barked or rossed are brought by a suitable conveyor and on which they are stored in suitable number to be automatically fed one by one to a log-hold or bin B in which they are heaped or piled up in a series to be fed one by one to the barking or rossing device C. Below the log-hold or bin and between its lower terminus and the barking device C is arranged a reciprocating log-ejector D, adapted to advance periodically and intermittently to remove the lowermost log from the barking device C and to drop it onto the delivery chute or way E, to be removed from the apparatus while permitting the next log above in the bin to drop into engagement with the barking device C.

The upper log-deck A is inclined as shown to permit the logs to roll automatically toward the forward portion of the deck, at which point is arranged an escapement stop $a'$, which is periodically tilted as hereinafter described to release one log and to arrest the next log in the series, the released log being then free to roll into log bin B.

The log bin B, log ejector D and abrading device C are subjected to considerable strains and shocks by the weight of the logs descending and rotating within the bin, and these parts are hence mounted on a supporting frame constructed as follows. On the two heavy standards 10, 10 of cast iron or other suitable material, and suitably secured or bolted to the foundation, are secured four stout brackets 1 of similar material, which brackets form the base for the upright arms 2 of cast metal, steel or other suitable material. The standards 10 are rigidly connected by two stay rods 110, 110, see Figs. 1, 2 and 3, and these stay rods are in turn firmly connected by suitably spaced brace-bars 111, two pairs in the present instance. To these arms 2 are firmly bolted the two vertical and parallel wall plates 3, 3 of sheet metal, such as boiler plate iron, or any other suitable and desirable material.

Figures 1, 1A, 1B, 1C, 1D:
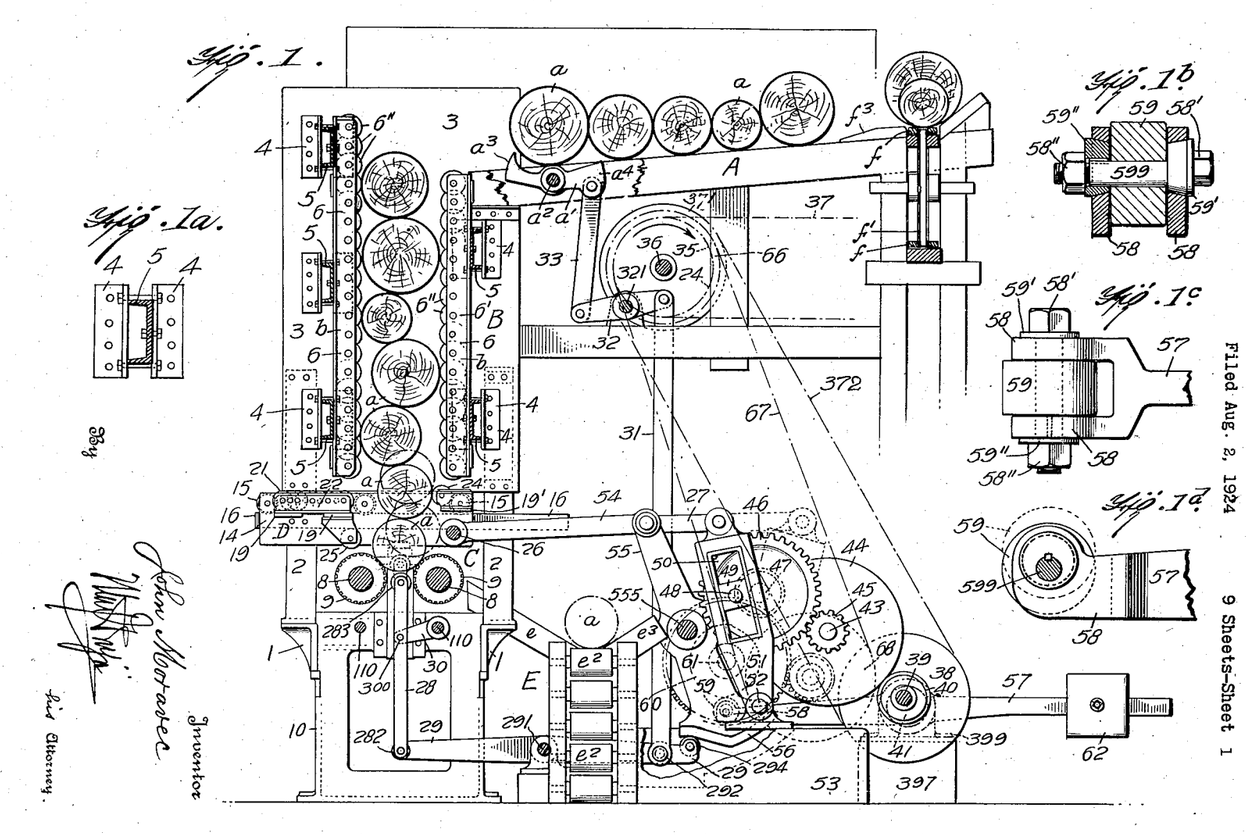
Figure 2:
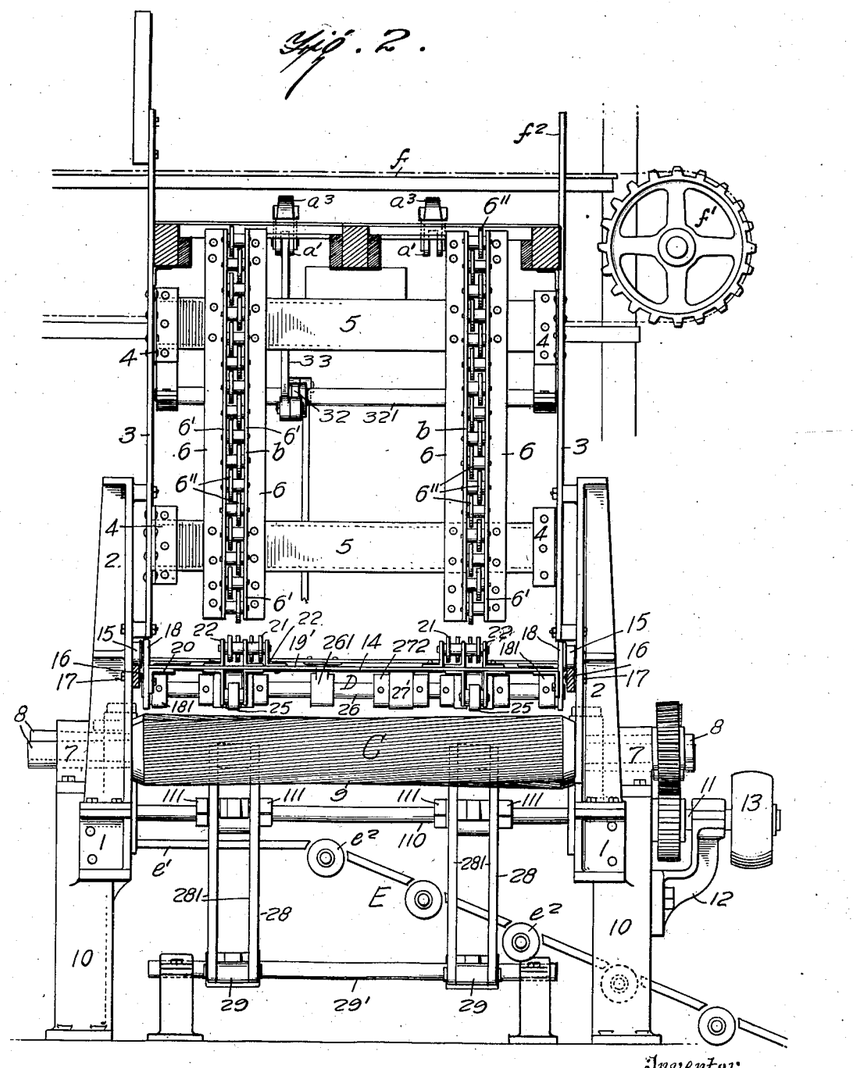
Fig. 2 is a vertical sectional elevation of said apparatus on a line passing through the log-hold or bin.

The wall plates 3, 3 form the end walls of the log bin B. The side walls of said bin are open and in the form of two pairs of tracks *b b b b*, as best seen in Figs. 1 and 2. These tracks *b* are formed each by a pair of upright angle irons 6 firmly bolted to a number (five in the present case) of connecting bars in the form of horizontal channel irons 5, which in turn are secured in position by being clamped between five pairs of angle iron brackets 4 which are riveted firmly to the end walls 3. This arrangement for supporting the tracks *b* is best shown in Figs. 1 and 2, taken in connection with Fig. 1ª.

The wall-plates 3 are thus rigidly stayed by the bars or channel-irons 5 which extend across from one plate to the other, being secured thereto at their respective ends as described above.

In order to facilitate the rolling movement of the logs *a* within the bin B for purposes to be stated further on, the tracks are provided with a continuous series of anti-friction rollers formed as disks 6'' extending from one end of the bin and the tracks to the other and all journaled in the inwardly extending flanges 6' of the angle irons 6 which form the tracks. As shown, these disks are arranged so as to successively overlap one another and their peripheries extend sufficiently beyond the tracks *b* to offer an effective anti-frictional support to the logs resting against the tracks. The rollers are made of any suitable resisting material, such as steel, for example.

The standards 10 also serve as a support for the pillow blocks 7 for the journals 8 of the rossing or abrading rollers 9 of the abrading device C for removing the bark. These rossing or abrading rollers may be of any desired or suitable construction and arrangement, but for illustration I have preferred to show the rossing device disclosed and claimed in my Letters Patent of the United States No. 1,456,328, of May 22, 1923, to which reference is hereby made for a full description of the same. As seen from Fig. 1, these rossing or abrading rollers are spaced apart and form a support for the lowermost log from the bin B. This abrading device comprising the abrading rollers 9, it is to be observed, extends substantially the entire length of the bin B, thus serving to remove the bark from the entire length of the logs at one and the same time. It will be noted by reference to Fig. 2 that the bearing for the lower driving shaft 11 of this rossing device is supported by a bracket 12 firmly bolted to standard 10. The pulley 13 keyed to shaft 11 serves to receive the power from any source of energy by a belt and to transmit it to the abrading device through the shaft 11.

Figure 4:
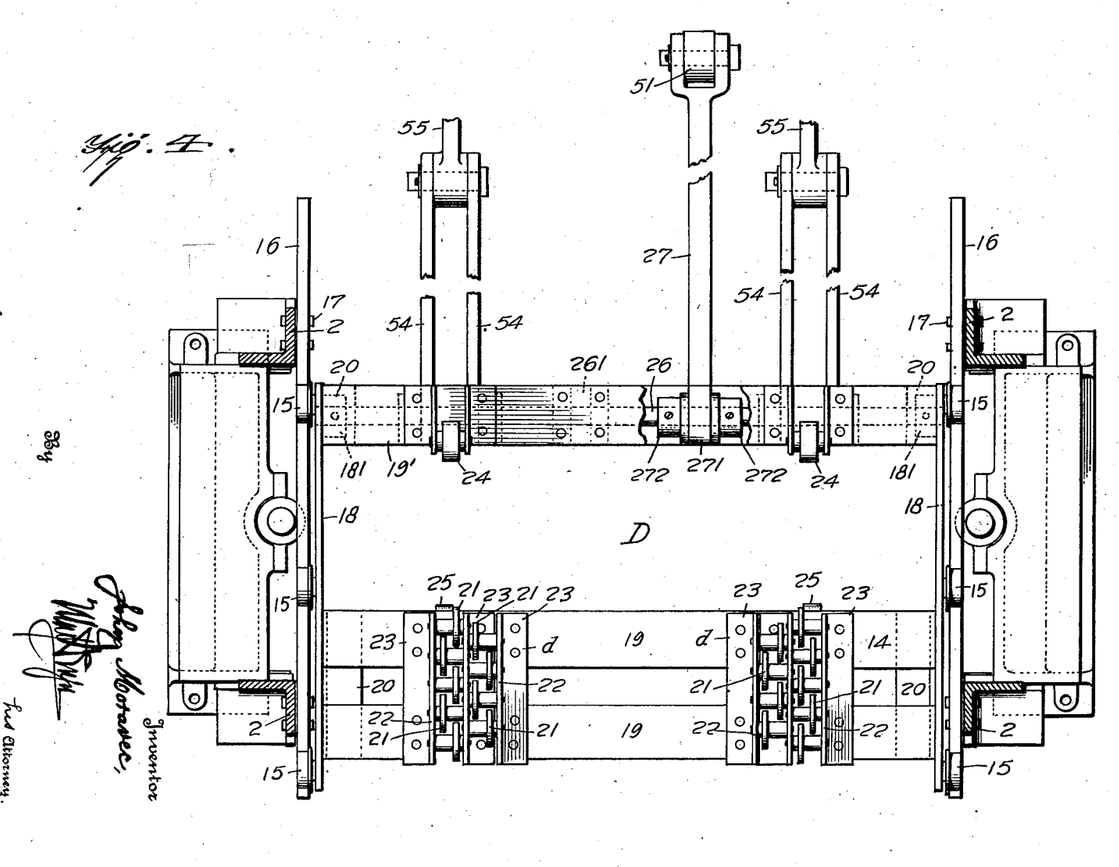
Fig. 4 is a plan view of the log-advancing carriage, on an enlarged scale.

This abrading device is arranged directly below the log hold or bin B in such a way as to receive each log as it arrives at the bottom of the bin. Between the abrading device C and the log hold or bin B is arranged the log-ejecting device D comprising a carriage 14, furnished with six guide rollers 15, resting and arranged to travel on the rails 16 secured to the upright arms 2 by bolts 17 or in any desired manner. The carriage is arranged to periodically and intermittently reciprocate horizontally and transversely to the log hold B, and between the same and the abrading device C, for the purpose of ejecting the lowermost log after it has been barked by the said abrading device C, passing it on to the delivery chute E, and permitting the next log above in the log-hold to descend into engagement with the rollers 9 of the rossing device. As seen in Figs. 1, 2 and 4, the carriage 14 comprises the side plates 18 of sheet metal, such as boiler plate, connected by the transverse bars 19 and 19', through the intervention of angle irons or brackets 20 properly bolted or riveted to the parts. As best shown in Fig. 4, sufficient space is left between the transverse bars 19 and 19' to form an opening to permit the descent of the logs to the rossing device when the carriage 14 is in its initial position, Fig. 1. In order to facilitate the easy passage of the carriage 14 under the tier of logs *a* in the hold B as these logs are lifted to some extent in the act of ejecting the barked lowermost log, an anti-friction device, in the form of a number of roll tracks *d, d* is mounted at the rear upper part or surface of the carriage on the bars 19, 19. These roll tracks *d*, it will be noted, consist of a series of anti-friction rollers or disks 21 whose horizontal axles are journaled in the upwardly extending flanges 22 of the angle irons 23 secured by riveting or bolting to the bars 19, 19. The sheaves in each roll track *d*, it will be seen, are arranged in two rows, the axles of each row breaking joints with those of the other row. It will be noted, moreover, that in each row the successive rollers are shifted laterally with respect to one another while their peripheries overlap one another, alternate rollers or sheaves being in line with one another. This arrangement of the rollers or sheaves of the roll track has the purpose of reducing as much as possible pulsations and shocks as the carriage passes beneath the pile of logs in the log hold.

At the upper forward portion and at the lower rear portion of the carriage and facing the opening or space between the bars 19 and 19' are arranged and mounted the friction rollers 24 and 25, respectively, as seen from Figs. 1, 2 and 4. As appears from Figs. 1 and 4, these rollers 24, 24 and 25, 25 extend somewhat into the said opening or space, and they serve to guide the logs into position on the rossing device C when the carriage is in its rear position, and to push out the log from the rossing device when the carriage moves forward. At the forward portion of the carriage D is mounted the transverse shaft 26, which is firmly and snugly secured at its ends in the two side plates 18, and prevented from longitudinal slip by the set collars 181, 181 one at each end, and to which the driving rod 27 from the carriage-actuating mechanism is connected by an eye 271 thereon which encircles said shaft 26 and is steadied and secured in place by and between collars 272 secured to the set-screws or in any suitable manner. To prevent any vibration of the shaft 26, an eyed bracket or stud 261 encircles the said shaft at an intermediate point and is bolted or otherwise secured to the bar 19', from which it depends.

Figure 3:
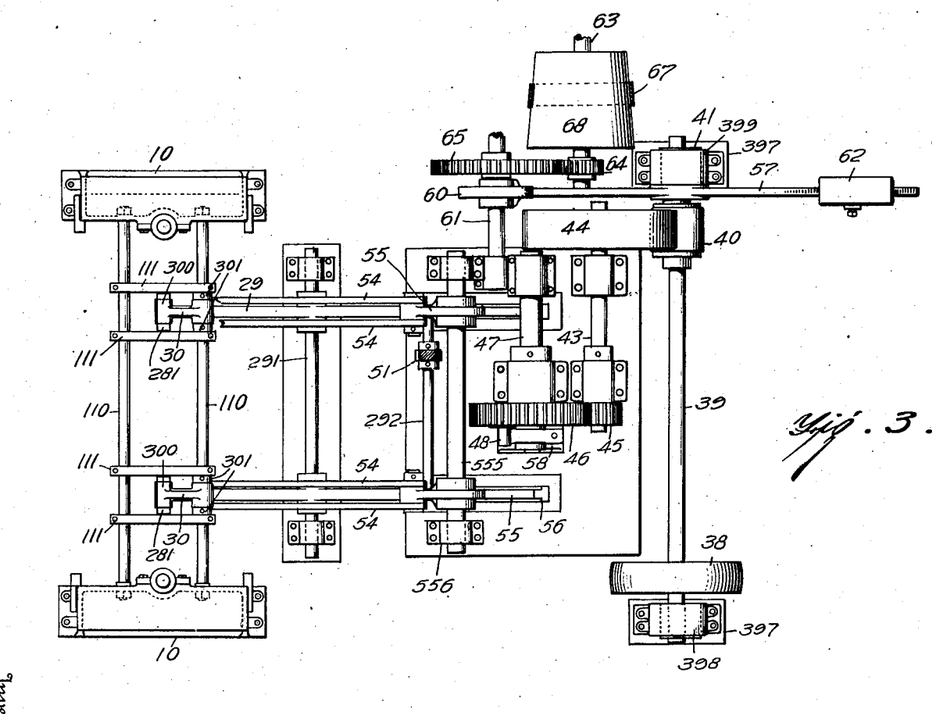
Fig. 3 is a plan view of the lower part of the apparatus.

To eject logs of smaller diameter by the carriage it is necessary to raise them somewhat out of engagement with the rollers of the rossing device in order to offer a minimum of resistance to the thrust of said carriage. For this purpose there are provided the two lifters 28, 28, each consisting of a pair of parallel vertical flat bars 281 which are guided between the brace-bars 111, as appears best in Figs. 2 and 3, and at their lower ends are each pivoted at 282 to the rear end of one of the rock levers 29, 29 to which a timed rocking movement is imparted by means described below. The lifters 28 are, moreover, connected each to one stay-rod 110 each by a link 30 pivoted at 300 to the respective lifter and loosely encircling the stay rod 110, set collars 301 being arranged on said stay rods between each link and the corresponding braces 111, as shown in Fig. 3, to properly steady the said links. At their upper extremities the lifters 28 are provided with friction-rollers 283 which reduce the friction of the log resting on the lifter, as it is being pushed away by the ejector.

In order to feed a further log from the deck A into the log bin B, as a log is ejected from under said bin by the log ejector D, I provide means to actuate the escapement stop $a'$ at each reciprocation of the carriage. These means comprise the following parts. The rock levers 29, 29, which are fulcrumed at 291, are firmly connected by stay rods 292. To this stay rod is pivoted a link rod 31 at one end, the other end of said link rod being pivoted to one arm of the lever 32 fulcrumed at 321, the other arm of said lever 32 being connected by a link 33 with one arm of the escapement-stop $a'$, which is pivoted at $a^2$. This escapement stop is formed with a log-arresting stop or abutment $a^4$ on its rear arm and a stop or abutment $a^3$ on the forward arm and is so arranged that when one of these stops extends fully into the path of the logs above the floor of the deck A the other is withdrawn out of such path, and vice versa. When the link rod 31 is caused to descend, which, through the means to be described further on, occurs at each ejection of a log from under the log bin, it tilts lever 32 and, through the resulting rise of link 33, tilts the escapement $a'$, thereby lowering the stop $a^3$ and releasing the last log $a$ on the deck and permitting it to roll into the bin B, while the stop $a^4$ simultaneously rises to intercept and arrest the next log of the series. When the link rod 31 rises, this play is reversed, the stop $a^3$ rises and the stop $a^4$ drops below the deck, the series of logs rolling forward until arrested by the stop $a^3$ and in position for the release of another log on the next descent of the link rod 31.

The means for driving and actuating the various parts of the apparatus so far described are best shown in Figs. 1 and 3. Power from any source of energy or motor is transmitted to the pulley 35 keyed to the upper counter shaft 36 by a belt 37, and thence from pulley 371, also keyed to said counter shaft 36, by belt 372 to the pulley 38 keyed or otherwise secured to the lower counter shaft 39 journaled in the bearings or pillow blocks 398 and 399. On the counter shaft 39 is firmly keyed a compact small friction roller 40. At the bearing 399 the shaft 39 passes loosely through the eccentric bushing 41, which is accurately fitted and arranged to oscillate to a small extent in the bearing 399, which bearing is firmly bolted to the foundation 397. On the shaft 43 is keyed a large friction roller 44 with which the small friction pulley 40 is brought into tight contact to rotate the same whenever the eccentric bushing for the shaft 39 is brought into the proper position therefor. At the end of the shaft 43 opposite the friction pulley 44 there is tightly shrunk and firmly keyed a spur pinion 45 which meshes with the spur gear 46, firmly fitted and keyed to the shaft 47. The spur gear 46 is provided with a crank or wrist pin 48 firmly fitted into the body of the gear and this wrist pin engages the sliding block 49 arranged to slide in the slot 50 of the rock arm 51 firmly trunnioned or pivoted in the bearing 52 secured to the foundation 5, Fig. 1. At its top this rock arm 51 is formed with an eyed head connected to the forward end of the driving rod 27 which connects with the shaft 26 of the carriage 14. By this mechanism the rock arm 51 is caused to oscillate and, through the driving rod 27, to impart a reciprocating movement to the carriage 14. In order to concurrently lift a small log *a* out of engagement with the rossing rollers 9 and into convenient position to be pushed forward with the least expenditure of energy and strain on the carriage 14 as the latter advances, and also to release a log on the deck A and to permit it to roll into the log bin B to replace the one being removed by the carriage, the levers 29 are rocked by the following device which receives its movement through the reciprocation of carriage 14. To the shaft 26 are connected the two pairs of links 54, 54, which in turn are connected by eyes to two rocking cam levers 55, 55 mounted and fixed on axle 555 journaled in bearings 556 and provided at their lower arms with the cam faces 56, 56, which bear on anti-friction rollers 294 on the forward extremity of the rock levers 29, thereby depressing that extremity of levers 29 and raising the other extremity and with it the lifters 28, which thereby raise the lowermost log from engagement with the rossing rollers 9 into a convenient position for impingement with the rollers 25 of the carriage, so that it can readily be rolled out of the apparatus into the delivering chute or way E as the carriage is drawn forward by driving rod 27. The cam 56 is so shaped that the lifters will not rise sufficiently to reach the logs of the larger diameters which rest on the rossing rollers, which do not sink sufficiently into the gap between these rollers and, therefore, occupy the correct height to be conveniently grasped by the rollers 25 of the carriage, but will only impinge and push against the small diameter logs. The shape of these cams is also such, and their movement is so timed, that the lifters will raise the logs before the rollers 25 impinge against said logs as the carriage advances. As the forward arm of the rock lever 29 descends it draws down the link 31, thereby operating the escapement *a'* to release and drop a log into the bin B as a log is being ejected and removed from the abrading device, as has been hereinbefore described.

For the purpose of alternately engaging and disengaging the friction rollers 40 and 44 and intermittently stopping the movement of the carriage 14, the lifter 28 and the escapement stop *a'*, a lever beam 57 is firmly shrunk and tightly fitted to the eccentric bushing 41. On the forked end 58 of the lever beam is journaled a friction roller 59 which bears against the cam 60 mounted on and firmly shrunk on or keyed to shaft 61. The other arm of the lever beam is provided with an adjustable weight 62 which serves to yieldingly press the friction roller 59 against the cam 60. The cam 60 receives its rotary movement from a shaft 63 through the pinion 64 keyed to said shaft 63 and meshing with the spur gear 65 keyed to the same shaft 61 with the cam 60. See in particular Fig. 3. To accurately adjust the required small amount of play between the friction rollers 40 and 44, the friction roller 59 is made adjustable with relation to the cam 60 by being rotatably mounted on an axle extending between two eccentric bushings whose arrangement and construction appear best in Figs. 1$^b$, 1$^c$ and 1$^d$, which represent a transverse vertical section, a plan view and a side view, respectively, on an enlarged scale, of the forked end of the arm and the parts it carries. As seen in these figures, the friction roller 59 is rotatably mounted on the axle 599, terminating at one end with an eccentric bushing 59' having a polygonal head 58', for enabling the bushing to be turned by a wrench or key, secured thereto or integral therewith. This bushing is fitted into one arm 58 of the forked end of the lever beam 57. The other end of the axle passes through and is keyed to a second eccentric bushing 59'' similarly fitted into the other arm of the forked end. The latter end of axle 599 is screw threaded and engaged by a nut 58''. It will be understood that by loosening the nut 58'' and turning the two bushings 59' and 59'' to the desired position, and then tightening the nut 58'' the friction roller will be raised or lowered with respect to cam 60, thereby varying the extent of play between the friction gears 40 and 44 to the amount desired for each oscillation of lever beam 57. To drive the shaft 63 and thereby to make the apparatus operate automatically there is arranged and firmly keyed on the counter shaft 36 a second pulley 66, which pulley is connected by belt or chain 67 with the lower pulley 68 firmly secured to the shaft 63 on which the spur pinion 64 is mounted.

Figure 5:
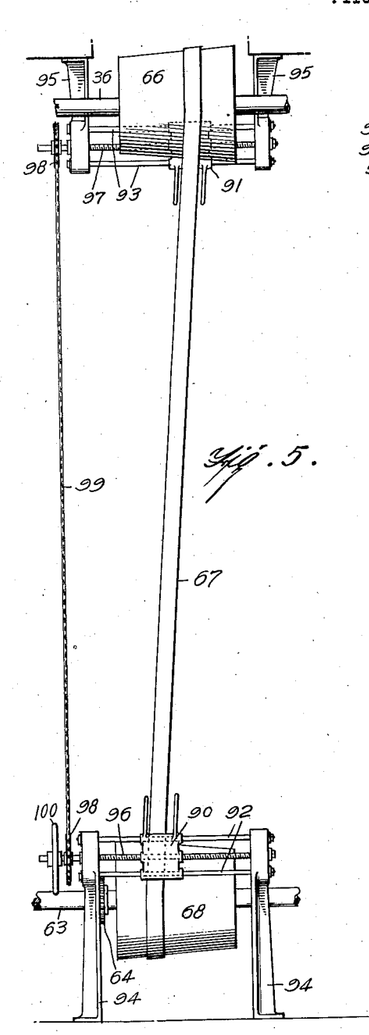
Figs. 5 and 6 are a front and side elevation, respectively, of a variable speed transmission device forming part of the apparatus.
Figure 6:
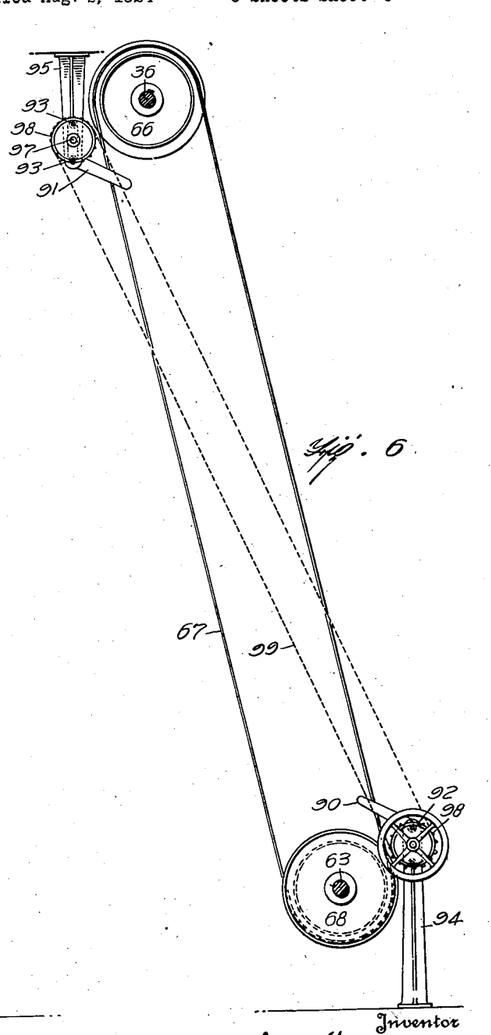

To make the speed of rotation of the cam 60 adjustable at will, the pulleys 66 and 68 are made reversely conical and means are provided to shift the belt on these pulleys. This arrangement is shown in Figs. 5 and 6. The belt shifter there shown comprises two belt-fork blocks 90, 91, one for each pulley, and arranged to slide on the guide rods 92 and 93 extending between the standards 94, 94 and the hanger brackets 95, 95, respectively, and which coincidently act as stay rods for these standards and brackets. Between the stay rods there is arranged a screw spindle 96 passing through and threaded into the belt-fork block 90; and a screw spindle 97 passing through and threaded into the belt-fork block 91. To each of these screw spindles is keyed at one end a sprocket wheel 98, the two sprocket wheels being connected by an endless sprocket chain 99 passing over them. To the lower spindle 96 is also keyed or secured a hand wheel 100. The operation of these parts is readily understood. By turning the hand wheel 100 in one or the other direction the lower fork block is caused to slide in one or the other direction, while the chain and sprocket wheel connection will cause the upper fork block to shift in the same direction. The belt being thereby shifted on the conical pulleys, the ratio of speed transmission will be changed in a manner well understood.

Somewhat in advance of and below the log hold or bin B and the abrading device C and lengthwise of the same, as shown, is arranged an inclined way or chute E onto which the rossed logs are rolled over the guideway e after being ejected by the carriage 14. This chute serves to deliver the logs from the apparatus to suitable conveyors below the same. As appears from Fig. 2, the inclined way or chute E meets the platform e' at a point below the abrading device which is considerably to the left of their center of gravity, said platform extending substantially from one extremity of the abrading device and the logs thereon to a point less than midway of the abrading device, as shown, so that as they descend from the abrading device they will immediately tilt into contact with the inclined way. To facilitate their movement down the said way the same is equipped with the anti-friction rollers or idlers $e^2$ projecting through the same at intervals, as shown. To prevent the logs from rolling beyond the chute as they descend, a ward or stop $e^3$ is arranged at the right of the chute.

The logs are fed to the log deck A in any desired manner, for example, by an endless chain f running transversely to the log hold over sprocket wheel f', the logs being delivered against a stop $f^2$ onto a seat $f^3$ having sufficient incline to cause the log to roll onto the hold A when it reaches said stop $f^2$.

The manner of operation of the apparatus is apparent from the foregoing. Assuming the carriage 14 to occupy its position of rest at the left in Fig. 1, the lowermost log a is being abraded or rossed by the rollers 9, 9, this action being assisted and accelerated by the weight of the superimposed logs in the log bin B. This occurs while the friction roller 59 of the lever beam 57 rests against the lower portion of cam 60. As the cam in its further revolution bears against the friction roller 59 with its higher portion it causes the right arm of the lever beam to rise and, through the eccentric bushing 41, to force the friction roller into contact with the roller 44, thereby causing the arm 51 to rock through the medium of the gears 45 and 46 and the slide block 49 working in slot 50, which arm 51 in turn, by drive rod 27, draws the carriage 14 forward to the right, thereby rolling the lowermost log a from off the abrading rollers 9, 9 by the lateral thrust exercised by the friction rollers 25 at the lower rear part of the opening in said carriage, the log being rolled forward until it descends over the guideway e into the chute by which it leaves the apparatus. For the logs of smaller diameter this ejecting action is assisted by the lifter 28, which is raised coincidently with the advance of the carriage by the lever beam 29 actuated by the cam lever 55 actuated from the carriage as herein above set forth. By thus raising the log as the carriage advances a great amount of resistance and injurious strains on the rear parts of the carriage are overcome, since by the lifter the log may be raised into such a position that the only resistances to be overcome by the carriage are those due to the weight of the logs in the bin and the rolling friction over the forward roller 9.

The position of the two lowermost logs when thus acted on by the lifter 28 and the roller 25 of the carriage 14 as it advances is indicated in dotted lines in Fig. 1.

As the undermost log is thus removed from the apparatus, a further log is coincidently fed to the bin B from the log deck by escapement stop a' whose forward stop $a^3$ is lowered to release the foremost log, permitting it to roll into the bin, by lever beam 29 through the medium of the rod 31, lever 32 and link 33 at the time the carriage advances and the lifter 28 rises, the movement being preferably so timed that a log on the deck will be released and will roll into the bin when the lowermost log has been completely removed from under the bin. The cam 60 is so formed and its movements are so timed that, through the intervention of the lever-beam 57 and the eccentric bushing 41 in which the shaft 39 of the friction roller 40 is journaled, said friction roller 40 will be in contact with the friction-gear wheel 44 sufficiently long to cause the rock arm 51 to make one complete oscillation, thus causing the reciprocating carriage 14 to advance to eject the undermost log from the abrading device, to return to its initial position at the left and to remain there sufficiently long to permit the next log that has descended to the abrading device to be completely barked before the carriage advances again.

As the carriage 14 advances to the right it closes the lower opening of the bin B, and opens it again on its return to its initial position of rest, thereby permitting the next log to descend to the abrading device.

A very important advantage due to the log-bin, in which the superimposed logs are fed one by one to the abrading device, besides speeding and improving the rossing operation by reason of the weight of the logs, lies in the fact that the rotation of the lowermost log is transmitted to these superimposed logs in the manner of a train of gearing, and this rotary motion of the contacting logs is materially assisted by the anti-friction disks 6″ which are arranged on the longitudinal inner sides of the bin, as shown. This rotation of the logs in contact with each other effects a considerable preliminary abrasion, wearing away and loosening of the bark before the logs reach the cutting rollers 9, 9, thereby materially shortening the time during which these rollers will have to act. Moreover, the disks 6″ against which the logs lean at one side or the other of the bin serve to wear annular grooves into the bark, severing the longitudinal fibres thereof, so that the said bark is divided into a number of annular jackets which are more readily removed from the log when it reaches the cutting rollers 9, 9.

Figure 7:
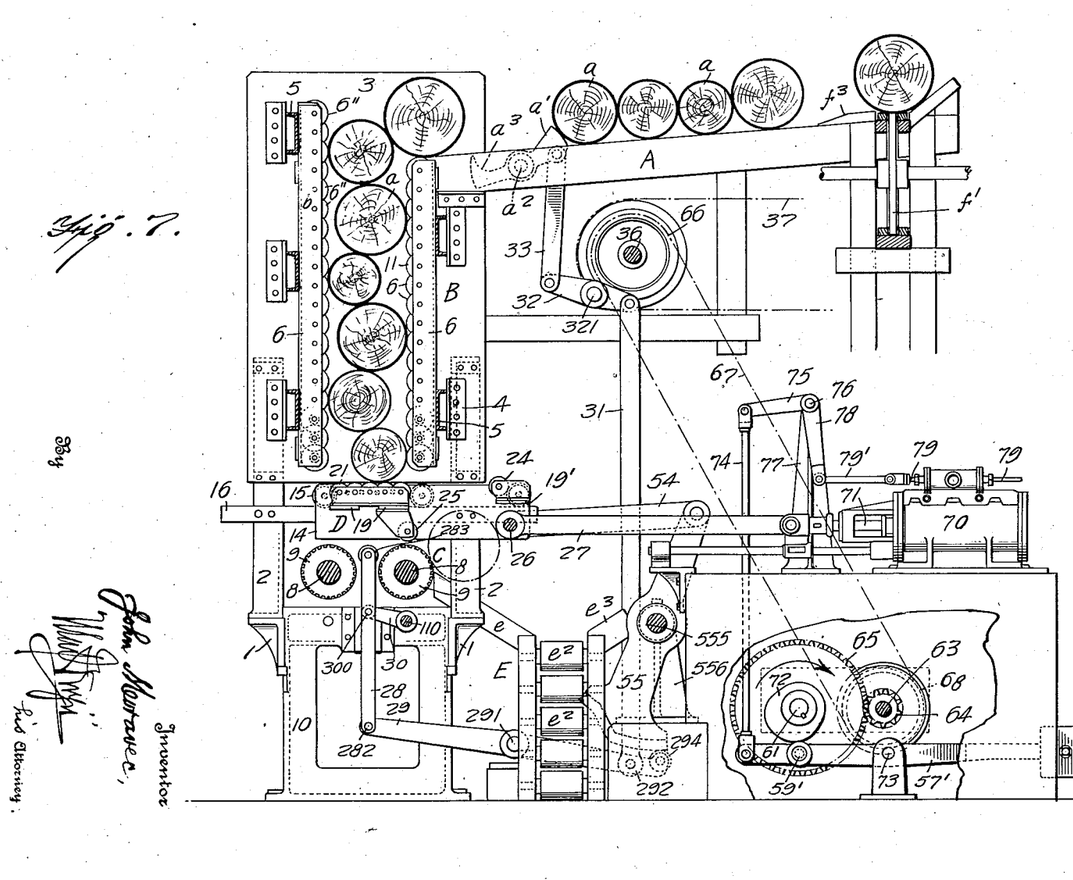
Fig. 7 is a vertical sectional elevation of a somewhat modified form of apparatus.
Figure 8:
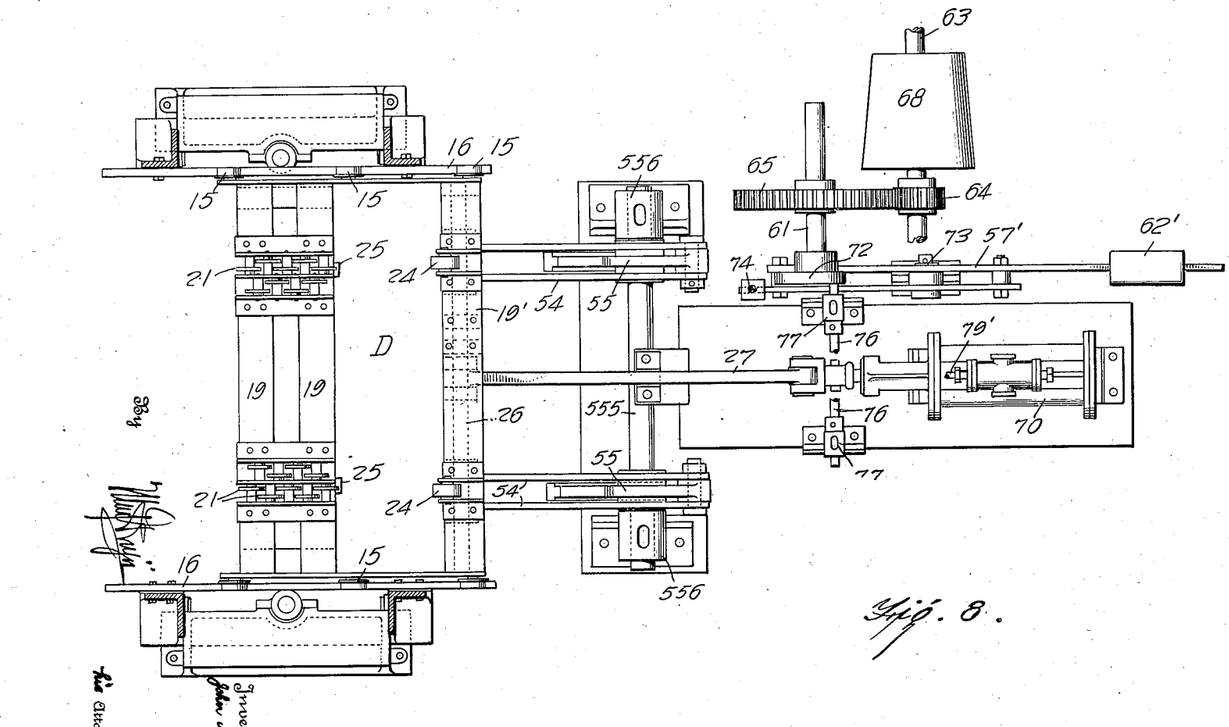
Fig. 8, a plan view.
Figure 9:
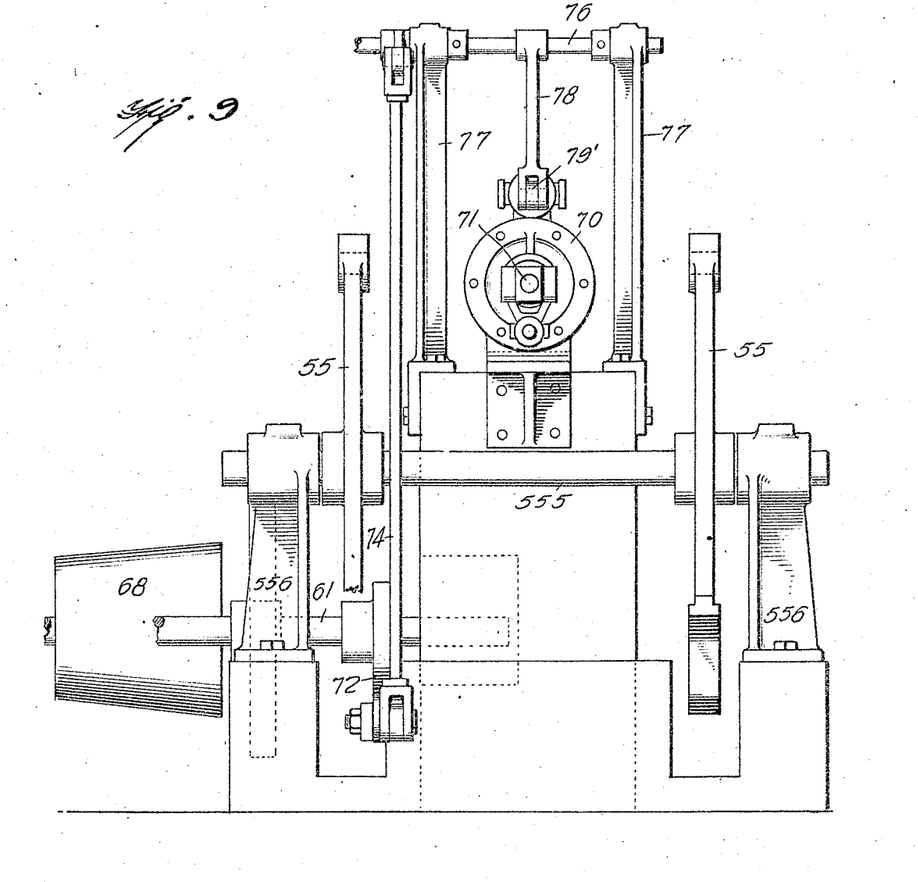
Fig. 9, an end elevation of the same.

The actuating mechanism in the apparatus thus far described and represented in Figs. 1 to 3 is most suitable for use in log-barking apparatus for handling logs of the smaller sizes having a length of four feet or thereabout. For apparatus designed for handling logs of a length ranging from eight to twelve feet I prefer to employ a direct connection of the log-ejecting carriage with a source of energy such as a steam or fluid driven piston. Such a modified apparatus is represented in Figs. 7, 8 and 9 of the drawing. By referring to these figures it will be observed that this modified embodiment of my invention is in all respects identical with the first form of apparatus except in the following particulars:

The carriage 14 is in this case connected to the piston-rod 71 of the steam engine 70 by the connecting or driving rod 27. In order that movement of the engine piston and consequently that of the carriage 14 shall proceed automatically and intermittently as in the first embodiment of my invention, I control the same from the counter shaft 36 through the belt 67, the pulley 68 and the spur pinion 64 on shaft 63 meshing with spur wheel 65 on shaft 61, all of which parts are as described in connection with the first embodiment of the invention. On the shaft 61 is firmly mounted and keyed the cam 72 against which impinges the friction roller 59′ on one arm of the lever arm 57′ fulcrumed at 73, and provided with an adjustable weight 62′ arranged on the other arm of the lever beam and of such magnitude as to maintain the roller 59′ in firm impingement against the cam 72. The end of the lever beam 57′ is connected by the pitman rod 74 with an arm 75, which arm is firmly secured and keyed against movement thereon to the small horizontal shaft 76 arranged to turn in bearings 77, to which shaft is firmly secured against movement thereon the depending arm 78, which in turn is connected to the steam-admission valve stem 79 by the link 79′. This depending arm 78 is fitted to the shaft 76 exactly in the vertical plane of the center line of the steam-admission valve stem 79, as appears from Fig. 9 of the drawing.

As the intermeshing spur wheels revolve in consequence of the rotation of the pulley 68, they cause the cam, acting in conjunction with the weight 62′, to alternately raise and lower the pitman-rod 74, which, through the intervention of the arms 75 and 78, causes the steam-admission valve stem 79 to be shifted to the right and then to the left, thereby causing carriage 14 to be drawn alternately and intermittently first in one direction and thereupon in the opposite direction by the piston rod 71 and the driving rod 27 connected to it, as will be readily understood. The cam 72 is so shaped in a manner well understood that when the carriage 14 is in its left-hand rear position with the opening between the bars 19 and 19′ below and registering with the bin B it will remain at rest a sufficient length of time to permit the log which passed from the bin through said opening to the abrading rollers 9, 9 to be entirely barked or rossed before the carriage is again drawn forward by the action of the engine to eject said log. By employing the cone pulleys and belt-shifting arrangement described in connection with the first described embodiment of my invention, the length of time for which the carriage is to remain at rest to suit the particular character of logs handled may be varied at pleasure and within practical limits.

Figure 10:
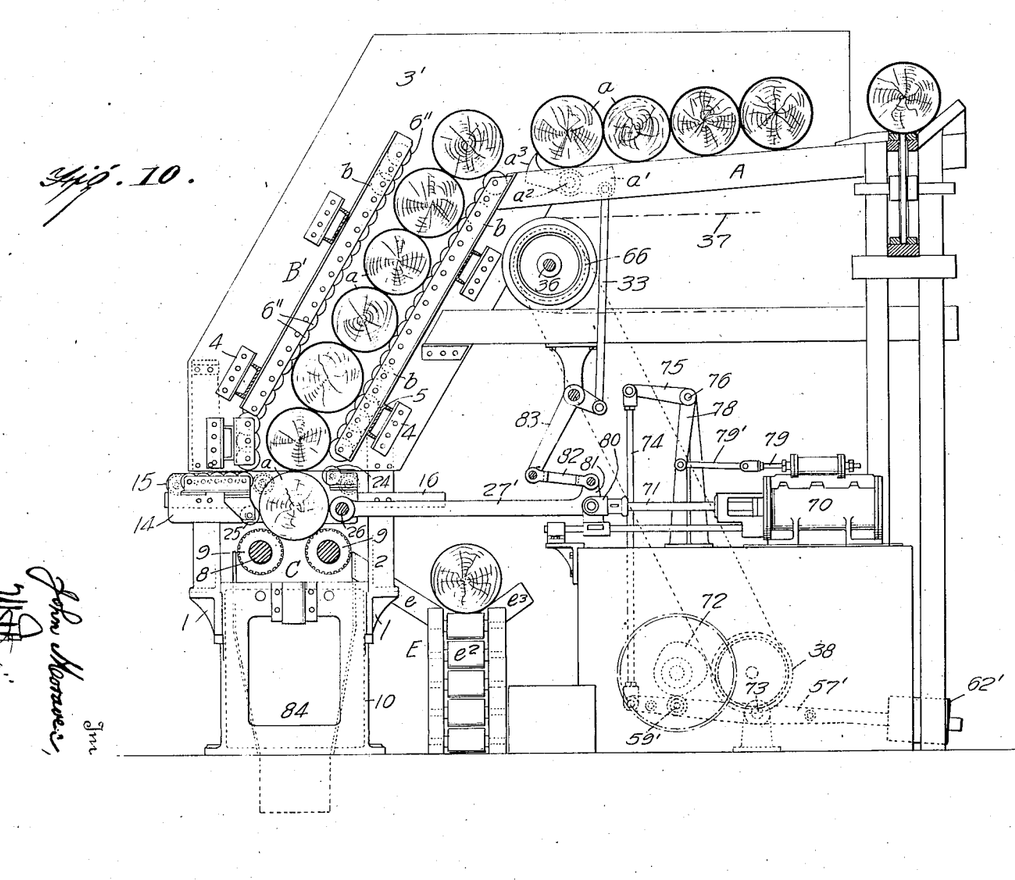
Fig. 10 represents in sectional side elevation still another modified form embodying my invention.

For manipulating very heavy logs, such as logs of twelve feet in length or thereabout and exceeding sixteen inches in diameter I prefer to arrange the log hold or bin in an inclined position and to dispense with the log-lifting devices 28 acting between the abrading rollers 9, 9, since there is no necessity for such lifter for the sizes exceeding 10 inches in diameter, as will be readily understood. An apparatus embodying such modification of my inventive idea is represented in Fig. 10 of the drawing. This apparatus is in all respects identical with the one described in connection with Figs. 7, 8 and 9, except in the following particulars. The log bin or hold B is in this case inclined, whereby its left hand tracks b are in position to take up a considerable part of the weight of the logs, thereby materially relieving the carriage 14 and the abrading device C of excessive and injurious strains. I find that by using four such roll-tracks b on the left side of the bin this weight can be supported with safety.

Since in this arrangement the log-lifter 28 of the preceding two forms of apparatus is eliminated, there is no necessity for the rocking cams 55 connected to the carriage and the lever beams 29, which, therefore, are also absent from this construction. In order to actuate the escapement stop a′, which in the preceding constructions was operated from the said lever beam 29, I have in this modification connected the same with the parts for reciprocating the carriage 14, as shown. The connecting rod 27' of the said carriage is provided above its connection with the cross-head 80 of the engine pitman rod with a projection 81, on which is pivoted a link 82 connected to one arm of the bell-crank lever 83, the other arm of which is connected to one arm of the escapement stop $a'$ by the link 33, thereby causing the logs on the deck A to be released and dropped into the bin or hold, one at each advance of the carriage 14, as in the preceding constructions.

This same movement for oscillating the escapement stop $a'$ may also be connected to the driving rod 27 in the construction shown in Figs. 1 to 4, thereby doing away with the long upright link rods 31, as will be readily understood.

By eliminating the log lifter between the abrading rollers 9, 9, a space, indicated in dotted lines at 84, is left below the said rollers, wherein may be installed a suitable bark conveyor for carrying the bark removed from the logs away from the apparatus to any suitable and desired point of use or disposal.

What I claim and desire to secure by Letters Patent is:

1. In a log-barking apparatus, a log-abrading device arranged to support and abrade a log, in combination with a log-ejecting device, and means for moving the log-ejecting device across the log-abrading device.

2. In a log-barking apparatus, a pair of rotating log-abrading rollers arranged to support a log between them, in combination with a log-ejecting carriage arranged over the abrading rollers, and means to reciprocate the carriage over the abrading rollers.

3. In a log-barking apparatus, a log bin for feeding a series of logs and a log-abrading device arranged below the feeding bin, in combination with a log-ejecting device arranged between the bin and the abrading device, and means for moving the ejecting device over the abrading device and transversely to the bin.

4. In a log-barking apparatus, a log bin and a pair of log-abrading rollers arranged below the bin to support a log between them, in combination with a log-ejecting carriage arranged between the bin and the abrading rollers, and means to reciprocate the carriage transversely to the bin.

5. In a log-barking apparatus, a log bin and a log-abrading device arranged below the bin, in combination with a log-ejecting carriage arranged between the bin and the abrading device, and means to intermittently reciprocate the carriage transversely to the bin, said carriage being formed with an opening to permit the passage of the logs from the bin to the abrading device when the carriage is in its position of rest.

6. In a log-barking apparatus, a log bin and a log-abrading device arranged below the bin, in combination with a log-ejecting carriage arranged between the bin and the log-abrading device, and means to periodically reciprocate the carriage transversely to the bin, said carriage being formed with an opening to permit the passage of a log from the bin to the abrading device when the carriage is in its position of rest, said carriage being provided with an anti-friction roll track at its rear upper surface.

7. In a log-barking apparatus, a log bin and a log-abrading device arranged below the bin, in combination with a log-ejecting carriage arranged between the bin and the abrading device, means to intermittently reciprocate the carriage transversely to the bin, said carriage being formed with an opening to permit the passage of the logs from the bin to the abrading device when the carriage is in its position of rest, and anti-friction rollers arranged at opposite sides of and facing the said opening.

8. In a log-barking apparatus, a log bin and a log abrading device arranged below the bin, in combination with a log-ejecting carriage arranged between the bin and the abrading device, means to intermittently reciprocate the carriage transversely to the bin, said carriage being formed with an opening to permit the passage of the logs from the bin to the abrading device when the carriage is in its position of rest, and anti-friction rollers arranged at the upper forward portion and at a lower rear portion of the carriage and extending into the said opening to guide a log from the bin to the abrading device as the carriage returns to its initial position of rest.

9. In a log-barking apparatus, a log bin and a log-abrading device arranged below the bin, in combination with a log-ejecting carriage arranged between the bin and the log-abrading device means to periodically reciprocate the carriage transversely to the bin, said carriage being formed with an opening to permit the passage of a log from the bin to the abrading device when the carriage is in its position of rest, said carriage being provided with an anti-friction roll track at its rear upper surface, and anti-friction rollers arranged at opposite sides of and facing the said opening to guide a log from the bin to the abrading device.

10. A log bin for receiving and feeding logs comprising substantially parallel tracks arranged on each of the opposite longitudinal sides of the bin, in combination with a series of anti-friction rollers journaled in the tracks.

11. A log bin for receiving and feeding logs comprising tracks arranged in pairs and longitudinally of the bin, in combination with a series of overlapping anti-friction disks arranged between each pair of tracks.

12. A log bin for receiving and feeding logs, comprising upright arms mounted on standards and a pair of substantially parallel wall plates secured to the upright arms, transversely connecting bars extending across from one wall-plate to the other between and secured at each end to one of the said wall plates, in combination with log tracks arranged longitudinally of the bin and secured to the transverse connecting bars.

13. A log bin for receiving and feeding logs, comprising a pair of substantially parallel wall plates, a number of pairs of angle-irons secured in two vertical rows to each wall-plate and transverse connecting bars between the wall plates arranged and secured between the angle irons, in combination with tracks arranged longitudinally of the bin and secured to the transverse connecting bars, and anti-friction rollers or sheaves journaled in the tracks.

14. A log bin for receiving and feeding logs, comprising a pair of substantially parallel wall-plates, transverse connecting bars between and secured at each end to the wall-plates, in combination with log tracks arranged longitudinally of the bin and each formed of a pair of angle-irons secured to the transverse connecting bars, and anti-friction rollers journaled between the angle-irons and projecting beyond the tracks.

15. A log-ejecting carriage provided with an opening to permit the passage of a log and provided at its upper rear portion with an anti-frictional track or tracks.

16. A log-ejecting carriage provided with an opening to permit the passage of a log and provided at its upper rear portion with an anti-frictional track or tracks, in combination with anti-frictional guide rollers for guiding a log in its descent through the opening arranged at the forward and the rear edges of the opening.

17. A log-ejecting carriage provided with an opening to permit the passage of a log and provided at its upper rear portion with an anti-frictional track or tracks, in combination with anti-frictional guide rollers for guiding a log in its descent through the opening arranged at the forward and the rear edges of the opening, the rear guide rollers being arranged at a lower plane of the carriage.

18. A log-ejecting carriage provided with an opening to permit the passage of a log and provided at its upper rear portion with an anti-frictional track or tracks, in combination with anti-frictional guide rollers for guiding the logs in their descent arranged at the lower rear portion and the upper forward portion of the carriage and facing the opening.

19. A log-ejecting carriage provided with an anti-frictional track or tracks, said track or tracks comprising, respectively, a series of rollers arranged in a number of rows, the axles of adjacent rows breaking joint with one another.

20. A log-ejecting carriage provided with an anti-frictional track or tracks, said track or tracks comprising a series of rollers, the sucessive roller being shifted laterally with respect to and overlapping one another.

21. A log-ejecting carriage provided with an anti-frictional track or tracks, comprising a series of rollers arranged in a number of rows, the axles of adjacent rows breaking joint with one another, the successive rollers being shifted laterally with respect to and overlapping one another.

22. In a log-barking apparatus, a log-abrading device, in combination with a log-ejecting device, means for intermittently moving the log-ejecting device over the log-abrading device, a log lifter for raising a log from the abrading device, and means for actuating said lifter as the ejecting device advances.

23. In a log-barking apparatus, a pair of log-abrading rollers arranged to support a log between them, in combination with a log-ejecting carriage arranged over the abrading rollers, a log lifter arranged to travel between the said rollers, and means to reciprocate the carriage over the rollers and to concurrently actuate the lifter.

24. In a log-barking apparatus, a log bin for feeding a series of logs and a log-abrading device arranged below the bin, in combination with a log-ejecting device arranged between the bin and the abrading device, a log lifter for raising a log from the abrading device, and means for moving the log-ejecting device over the abrading device and for actuating the lifter.

25. In a log-barking apparatus, a log bin and a pair of log-abrading rollers arranged below the bin to support a log between them, in combination with a log-ejecting carriage arranged between the bin and the abrading rollers, a log lifter arranged to travel between the rollers, means to reciprocate the carriage over the rollers and to concurrently actuate the lifter.

26. In a log-barking apparatus, a log bin and log-abrading device below the bin, in combination with a log-ejecting carriage arranged between the bin and the abrading device and formed with an opening to permit the passage of the logs from the bin to the abrading device when the carriage is in its starting position, a log lifter for raising a log from the abrading device, means for intermittently reciprocating the carriage, and means for periodically actuating the lifter.

27. In a log-barking apparatus, a log deck for supporting a series of logs, a log bin arranged to receive the logs from the deck and an escapement stop for releasing the logs on the deck one by one, in combination with a log-abrading device below the bin, a log-ejecting device arranged between the bin and the abrading device, means for periodically moving the carriage over the abrading device and concurrently actuating the escapement stop to release a log on the deck as the carriage moves forward.

28. In a log-barking apparatus, an inclined log deck for supporting a series of logs, a log bin arranged contiguous to and extending below the said log deck, an escapement stop arranged to release the logs on the deck in succession, in combination with a log-abrading device below the bin, a log-ejecting carriage arranged between the abrading device and the bin, means to intermittently reciprocate the carriage transversely to the bin and over the abrading device, and means connected with the carriage for actuating the escapement stop to release a log on the deck as the carriage removes a log from the abrading device.

29. In apparatus of the character described, a bin for feeding a series of logs, a log-abrading device and an ejecting device arranged to travel between the bin and the abrading device, in combination with a motor and means connected with the motor to reciprocate the ejecting device, and means also connected with the motor to intermittently arrest the reciprocating means when the ejecting device has arrived at its initial position.

30. In apparatus of the character described, a feeding device for logs, a log-abrading device below the same and a log-ejecting carriage arranged to travel between the log-feeding device and the abrading device, in combination with a rock-arm connected with the carriage, means for oscillating said rock-arm, and means connected with said oscillating means for intermittently arresting the same when the rock-arm and carriage have arrived at their initial point.

31. In apparatus of the character described, a log bin for feeding a series of logs, a log-abrading device arranged below the bin and an ejecting device arranged to travel between the bin and the abrading device, in combination with a motor shaft and connections between the same and the ejecting device to reciprocate the said ejecting device, and means connected to said ejecting device and connected with and actuated by the motor shaft to arrest the reciprocating means when the ejecting device has arrived at its initial position.

32. In a log barking apparatus, a pair of log-abrading rollers arranged to support a log between them, in combination with a log-ejecting carriage arranged over the log-abrading rollers, and means to periodically reciprocate the carriage over the abrading rollers.

33. In a log barking apparatus, a log bin for feeding a series of logs and a log-abrading device arranged below the bin, in combination with a log-ejecting device arranged between the bin and the abrading device, and means for moving the log-ejecting device over the abrading device.

34. In apparatus of the character described, a log-abrading device and a log-ejecting carriage arranged to travel over the log-abrading device, in combination with a rock-arm connected with said carriage, means for oscillating said rock-arm, said oscillating means comprising a pair of friction rollers arranged to intermittently contact with one another, and means for intermittently breaking the contact between said friction rollers.

35. In apparatus of the character described, a log-abrading device and a log-ejecting carriage arranged to travel over the log-abrading device, in combination with a rock-arm connected with said carriage, means for oscillating said rock-arm, said oscillating means comprising a pair of friction rollers arranged to intermittently contact with one another, one of said friction-rollers being journaled in an eccentric bushing adapted to turn in its bearing, a lever beam fixed to the eccentric bushing, a rotary cam, and means for yieldingly holding one end of the lever beam against the cam, whereby the friction rollers are intermittently separated, and the carriage is intermittently arrested in its movement.

36. In apparatus of the character described, a log-abrading device and a log-ejecting carriage arranged to travel over the log-abrading device, in combination with a rock-arm connected with said carriage, means for oscillating said rock-arm, said oscillating means comprising a pair of friction rollers arranged to intermittently contact with one another, one of said friction-rollers being journaled in an eccentric bushing adapted to turn in its bearing, a lever-beam fixed to the eccentric bushing, a rotary cam, means for yieldingly holding one end of the lever-beam against the cam, and means for varying the speed of the rotary cam, whereby the carriage is arrested in its movement each time it reaches its initial position, and its period of rest may be adjusted according to the character of the log to be abraded.

37. In apparatus of the character described, a log-abrading device and a log-ejecting carriage arranged to travel over the log-abrading device, in combination with a rock-arm connected with said carriage, means for oscillating said rock-arm, said oscillating means comprising a pair of friction rollers arranged to intermittently contact with one another, one of said friction-rollers being journaled in an eccentric bushing, a lever-beam fixed to the eccentric bushing, a rotary cam, and means for holding one end of the lever-beam against the cam, said end of the lever-beam being provided with a friction-roller mounted in eccentric adjustable bearings, to permit the adjustment of the gap between the friction-rollers in their inoperative position.

38. A log-abrading device and means for ejecting a log transversely from the same, in combination with a chute arranged below and lengthwise of the same, said chute comprising an inclined way the upper end of which extends beyond the middle of the length of the log-abrading device.

39. A log-abrading device and means for ejecting a log from the same, in combination with a chute for carrying off the log below the same and comprising a substantially horizontal platform below the abrading device extending substantially from one end of the abrading device to a point less than midway of the length of the abrading device, and an inclined way sloping downward from said point of the platform.

In testimony whereof I hereunto affix my signature.

JOHN MORAVEC.